United States Patent
Augsburg et al.

(10) Patent No.: US 6,807,608 B2
(45) Date of Patent: Oct. 19, 2004

(54) MULTIPROCESSOR ENVIRONMENT SUPPORTING VARIABLE-SIZED COHERENCY TRANSACTIONS

(75) Inventors: Victor Roberts Augsburg, Cary, NC (US); James Norris Dieffenderfer, Apex, NC (US); Bernard Charles Drerup, Austin, TX (US); Richard Gerard Hofmann, Apex, NC (US); Thomas Andrew Sartorius, Raleigh, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/077,560

(22) Filed: Feb. 15, 2002

(65) Prior Publication Data

US 2003/0159005 A1 Aug. 21, 2003

(51) Int. Cl.[7] .............................................. G06F 12/00
(52) U.S. Cl. ......................... 711/146; 711/141; 710/20
(58) Field of Search ............................ 710/20; 711/146, 711/141, 113, 118, 119, 120, 122, 128, 130

(56) References Cited

U.S. PATENT DOCUMENTS

| | | | |
|---|---|---|---|
| 5,313,591 A | | 5/1994 | Averill ........................ 395/325 |
| 5,469,558 A | | 11/1995 | Lieberman et al. ......... 395/285 |
| 5,603,005 A | * | 2/1997 | Bauman et al. .............. 711/124 |
| 5,604,865 A | * | 2/1997 | Lentz et al. ................. 710/316 |
| 5,715,430 A | | 2/1998 | Hirayama .................... 395/468 |
| 5,781,918 A | | 7/1998 | Lieberman et al. ............. 711/5 |
| 5,913,231 A | | 6/1999 | Lewis et al. ................. 711/209 |
| 5,966,733 A | | 10/1999 | Brewer ........................ 711/170 |
| 6,061,764 A | | 5/2000 | Chittor et al. ............... 711/141 |
| 6,212,601 B1 | * | 4/2001 | Shiell .......................... 711/118 |
| 6,249,845 B1 | * | 6/2001 | Nunez et al. ................ 711/129 |
| 6,430,658 B1 | * | 8/2002 | Nunez et al. ................ 711/146 |
| 6,460,133 B1 | * | 10/2002 | Nunez et al. ................ 712/214 |
| 6,601,144 B1 | * | 7/2003 | Arimilli et al. .............. 711/146 |
| 6,704,843 B1 | * | 3/2004 | Arimilli et al. .............. 711/146 |
| 6,732,208 B1 | * | 5/2004 | Alsaadi et al. ............... 710/112 |

OTHER PUBLICATIONS

Won–Kee Hong et al., "Design and performance evaluation of an adaptive cache coherence protocol," *IEEE Xplore*, 1998, pp. 33–40.

Won–Kee Hong et al., "An effective full–map directory scheme for the sectored caches," *IEEE Xplore*, 1997, pp. 7–11.

* cited by examiner

*Primary Examiner*—Jeffrey A. Gaffin
*Assistant Examiner*—Harold Kim
(74) *Attorney, Agent, or Firm*—Scott W. Reid; Winstead, Sechrest & Minick, P.C.

(57) ABSTRACT

A method and system for performing variable-sized memory coherency transactions. A bus interface unit coupled between a slave and a master may be configured to receive a request (master request) comprising a plurality of coherency granules from the master. Each snooping unit in the system may be configured to snoop a different number of coherency granules in the master request at a time. Once the bus interface unit has received a collection of sets of indications from each snooping logic unit indicating that the associated collection of coherency granules in the master request have been snooped by each snooping unit and that the data at the addresses for the collection of coherency granules snooped has not been updated, the bus interface unit may allow the data at the addresses of those coherency granules not updated to be transferred between the requesting master and the slave.

24 Claims, 6 Drawing Sheets

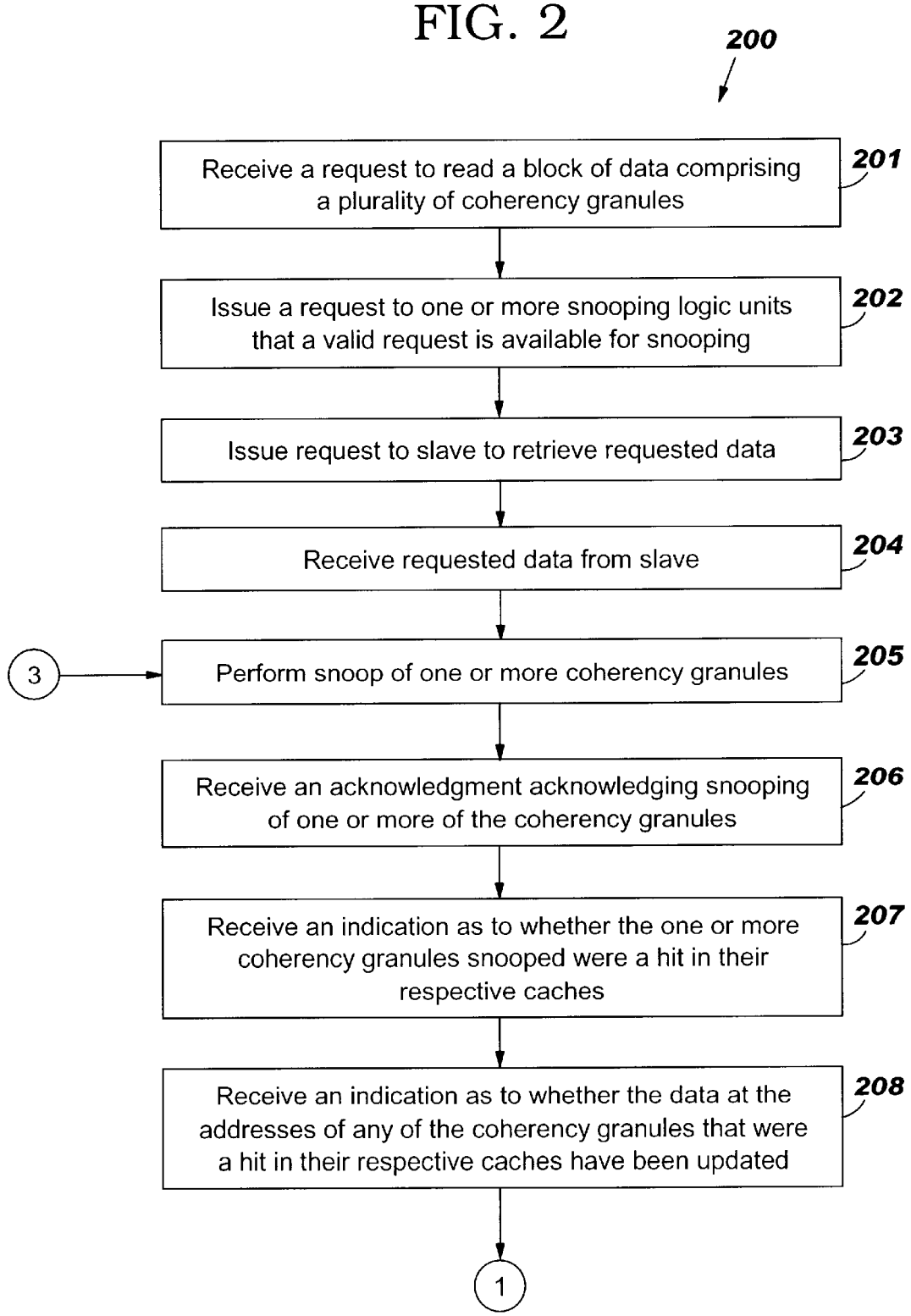

MULTIPROCESSOR ENVIRONMENT SUPPORTING VARIABLE-SIZED COHERENCY TRANSACTIONS

TECHNICAL FIELD

The present invention relates to the field of cache coherency in a multiprocessor environment, and more particularly to a multiprocessor system supporting issuing and receiving requests of multiple coherency granules.

BACKGROUND INFORMATION

A multiprocessor system may comprise multiple processors coupled to a common shared system memory. Each processor may comprise one or more levels of cache memory (cache memory subsystem). The multiprocessor system may further comprise a system bus coupling the processing elements to each other and to the system memory. A cache memory subsystem may refer to one or more levels of a relatively small, high-speed memory that is associated with a particular processor and stores a copy of information from one or more portions of the system memory. The cache memory subsystem is physically distinct from the system memory.

A given cache memory subsystem may be organized as a collection of spatially mapped, fixed size storage region pools commonly referred to as "sets." Each of these storage region pools typically comprises one or more storage regions of fixed granularity. These storage regions may be freely associated with any equally granular storage region (storage granule) in the system as long as the storage region spatially maps to the set containing the storage region pool. The position of the storage region within the pool may be referred to as the "way." The intersection of each set and way contains a cache line. The size of the storage granule may be referred to as the "cache line size." A unique tag may be derived from an address of a given storage granule to indicate its residency in a given set/way position.

When a processor generates a read request and the requested data resides in its cache memory subsystem, e.g., L1 cache, then a cache read hit takes place. The processor may then obtain the data from the cache memory subsystem without having to access the system memory. If the data is not in the cache memory subsystem, then a cache read miss occurs. The memory request may be forwarded to the system and the data may subsequently be retrieved from the system memory as would normally be done if the cache did not exist. On a cache miss, the data that is retrieved from the system memory may be provided to the processor and may also be written into the cache memory subsystem due to the statistical likelihood that this data will be requested again by that processor. Likewise, if a processor generates a write request, the write data may be written to the cache memory subsystem without having to access the system memory over the system bus.

Hence, data may be stored in multiple locations, e.g., the cache memory subsystem of a particular processor as well as system memory. If another processor altered the contents of a system memory location that is duplicated in a first processor's cache memory subsystem, the cache memory subsystem may be said to hold "stale" or invalid data. Problems may result if the first processor inadvertently referenced this on a subsequent read. Therefore, it may be desirable to ensure that data is consistent between the system memory and caches. This may commonly be referred to as "maintaining cache coherency." In order to maintain cache coherency, therefore, it may be necessary to monitor the system bus when the processor does not control the bus to see if another processor accesses system memory. This method of monitoring the bus is referred to in the art as "snooping."

Each processor's cache memory subsystem may comprise a snooping logic unit configured to monitor the bus for the addresses requested by other processors. Each snooping logic unit may further be configured to determine if a copy of an address requested by another processor is within the cache memory subsystem associated with the snooping logic unit. The snooping logic unit may determine if a copy of the address requested by another processor is within the cache memory subsystem associated with the snooping logic unit using a protocol commonly referred to as Modified, Exclusive, Shared and Invalid (MESI). In the MESI protocol, an indication of a coherency state is stored in association with each unit of storage in the cache memory subsystem. This unit of storage is referred to a coherency granule and is typically the size of a cache line. Each coherency granule may have one of four states, modified (M), exclusive (E), shared (S), or invalid (I), which may be indicated by two or more bits in the cache directory. The modified state may indicate that a coherency granule is valid only in the cache memory subsystem containing the modified or updated coherency granule and that the value of the updated coherency granule has not been written to system memory. When a coherency granule is indicated as exclusive, the coherency granule is resident in only the cache memory subsystem having the coherency granule in the exclusive state. However, the data in the exclusive state is consistent with system memory. If a coherency granule is marked as shared, the coherency granule is resident in the associated cache memory subsystem and may be in at least one other cache memory subsystem in addition to the system memory. If the coherency granule is marked as shared, all of the copies of the coherency granule in all cache memory subsystems so marked are consistent with the system memory. Finally, the invalid state may indicate that the data and the address tag associated with the coherency granule are both invalid and thus are not contained within that cache memory subsystem.

Typically, in a multiprocessor system, the cache memory subsystems associated with the various processors may comprise a plurality of cache line sizes. Such a system may be considered a heterogeneous multiprocessor system. In such a system, the size of the coherency granule for the system is considered to be the size of the smallest coherency granule for any entity within the system. Thus, when a processor with a relatively larger cache line size performs a read or write operation for a cache line in the system, the operation may be associated with a plurality of coherency granules in the system. Similarly, a system may contain some non-processor entities, such as an I/O device or a DMA (Direct Memory Access) controller. Such non-processor entities may also perform operations in the system, which are associated with a particular block of memory. The size of the operation may vary and may consist of a plurality of coherency granules within the system.

When an operation is associated with a plurality of coherency granules, then as part of the operation the snooping logic associated with each processor may examine the coherency status of each of these coherency granules and respond accordingly. This may be accomplished by performing the operation as a series of independent requests where each request may consist of a single coherency granule. By issuing separate requests for each coherency granule involved in the operation, several additional bus cycles may be used and additional power may be consumed. These additional bus cycles and additional power may be associated with the independent requests themselves and the responses by the slaves to those independent requests. The additional bus cycles and additional power may also be associated with the independent snooping operations that may be performed by the snooping logic associated with each of the processors in the system. Alternatively, the system may perform the multi-coherency granule operation as a single request, but the snooping logic associated with each processor in the system may provide a single snoop response for the entire operation. The system in turn may have to wait for the snooping logic associated with each processor in the system to complete all of the snoop operations associated with the request before proceeding to initiate the transfer of data between the master entity making the request and the slave device for which the request is targeted. Again this procedure involves additional delay in performing the operation thereby inefficiently using the bandwidth available to the system.

It would therefore be desirable to develop a heterogeneous multiprocessor environment that supports the issuing and receiving of a single request that references multiple coherency granules. It would further be desirable to develop a heterogeneous multiprocessor environment that allows the snooping logic associated with each processor in the system to provide the snoop response for only a portion of the requested coherency granules at a time such that the system makes forward progress on the operation with less delay thereby improving the bandwidth of the system and reducing overall power.

SUMMARY

The problems outlined above may at least in part be solved in some embodiments by a bus interface logic unit coupled between a slave, e.g., memory, and a plurality of masters, e.g., processors, configured to issue a request to a snooping logic unit in each cache in the multiprocessor system that a multiple coherency granule request is available for snooping. A coherency granule may refer to the smallest cache line size of a cache in the multiprocessor system. Each snooping logic unit may be configured to snoop a different number of coherency granules at a time. Once the bus interface logic unit has received a collection of sets of indications indicating that one or more coherency granules in the multiple coherency granule request has been snooped by each snooping logic unit in the multiprocessor system and that the data at the addresses for the one or more coherency granules has not been updated, then the bus interface logic unit may allow the data at the addresses of those one or more coherency granules to be transferred between the requesting master and the slave device. By transferring data between the requesting master and the slave device prior to receiving a set of indications regarding the other coherency granules in the multiple coherency granule request, the multiprocessor system may make forward progress on the operation of the multiple coherency granule request with less delay thereby improving the bandwidth of the system and reducing overall power.

In one embodiment of the present invention, a method for performing a read request comprising a plurality of coherency granules may comprise the step of a bus interface logic unit receiving a request from a master, e.g., processor, (commonly referred to as a master request), to read a block of data comprising a plurality of coherency granules in a slave, e.g., memory. The bus interface logic unit may be coupled to each master which may serve as an interface between a bus and each master. The bus may further be coupled to the slave. A coherency granule may refer to the smallest cache line size of a cache in a multiprocessor system.

The bus interface logic unit may issue a request (commonly referred to as a snoop request) to a snooping logic unit in each cache in the multiprocessor system indicating that a valid request is available for snooping. The bus interface logic unit may further issue a request to the slave to retrieve the data requested by the master. The bus interface logic unit may then receive the requested data from slave.

By a snooping logic unit being informed that a valid request is available for snooping, the snooping logic unit may then perform the snooping method on one or more of the coherency granules of the master request. Each snooping logic unit may be associated with a different sized cache line. That is, each snooping logic unit may be capable of snooping a different number of coherency granules at a time. Since snooping units may snoop a different number of coherency granules at a time, the data requested by the master may be transferred to that master by the bus interface logic unit in stages. That is, the bus interface logic unit may transfer one or more coherency granules of the data requested to the master at a time once each snooping logic unit has provided indications that the one or more coherency granules may be transferred as described in greater detail below. It is noted that even though the following describes steps performed by a particular snooping logic unit that the description is applicable to each snooping logic unit of the multiprocessor system.

As stated above, a snooping logic unit may perform the snooping method on one or more of the coherency granules of the master request. The number of coherency granules that may be snooped at one time by a snooping logic unit may be dependent upon the particular snooping logic unit. Once the one or more coherency granules have been snooped, the bus interface logic unit may receive an acknowledgment from the snooping logic unit that the snooping logic unit performed the snooping on the one or more coherency granules via a multiple bit bus. Each bit in the bus may be associated with a particular coherency granule in the multi-coherency granule request. The bus interface logic unit may further receive an indication from the snooping logic unit as to whether the one or more coherency granules snooped were a hit in the cache associated with the snooping logic unit via a multiple bit bus. Each bit in the bus may be associated with a particular coherency granule in the multi-coherency granule request. The bus interface logic unit may further receive an indication from the snooping logic unit as to whether the data associated with the addresses of the one or more coherency granules that were a hit in the cache associated with snooping logic unit have been updated in that cache via a multiple bit bus. Again, each bit in the bus may be associated with a particular coherency granule in the multi-coherency granule request. These indications may collectively be called a "collection of sets of indications" where each set of indications, i.e., each corresponding bit in each bus, is associated with a particular coherency granule in the multi-coherency granule request.

A determination may be made by the bus interface logic unit as to whether any of the data at the addresses of the coherency granules snooped had been updated in a cache in the system. If the data in a cache at the address of the coherency granules snooped had not been updated, then the bus interface unit may transmit to the master the data associated with the one or more of the one or more coherency granules snooped that were not updated.

If the data at the address of a coherency granule snooped has been updated, then the bus interface logic unit may receive the updated data from the snooping logic unit associated with the cache containing the updated data.

In one embodiment, upon receiving the updated data, the bus interface logic unit may write the received updated data to the slave thereby updating the slave to maintain memory coherency within the multiprocessor system. The bus interface logic unit may then read the updated data from the slave and transfer the updated data to the master.

In another embodiment, upon receiving the updated data, the bus interface logic unit may instead directly transfer the received updated data to the requesting master. The bus interface logic unit may then subsequently or concurrently write the updated data to the slave.

A determination may then be made as to whether there are more coherency granules to snoop. If there are more coherency granules to snoop then the snooping logic unit may snoop one or more coherency granules of the request as described above. As stated above, each snooping logic unit may be configured to snoop at a different rate than the other snooping logic units thereby completing the snooping of all of the coherency granules of the request at a different time than the other snooping logic units. It is noted that the bus interface logic unit may be configured to only transfer the non-updated or updated data associated with those coherency granules that have been snooped by each snooping logic unit in the multiprocessor system. Subsequently, the requested data may be transferred to the master in a staggered manner.

If there are no more coherency granules to snoop, then the method is terminated.

In one embodiment of the present invention, a method for performing a write request comprising a plurality of coherency granules may comprise the step of a bus interface logic unit receiving a request (commonly referred to as a master request) to write a block of data to a slave, e.g., memory, comprising a plurality of coherency granules from a master, e.g., processor. The bus interface logic unit may be coupled to each master which may serve as an interface between a bus and each master. The bus may further be coupled to the slave. A coherency granule may refer to the smallest cache line size of a cache in a multiprocessor system.

The bus interface logic unit may issue a request (commonly referred to as a snoop request) to a snooping logic unit in each cache in the multiprocessor system indicating that a valid request is available for snooping. The bus interface logic unit may receive data to be written to the slave from the master.

By the snooping logic unit being informed that a valid request is available for snooping, the snooping logic unit may then perform the snooping method on one or more of the coherency granules of the master request. As stated above, each snooping logic unit may be associated with a different sized cache line. That is, each snooping logic unit may be capable of snooping a different number of coherency granules at a time. Since snooping units may snoop a different number of coherency granules at a time, the data received from the master may be transferred to the slave by the bus interface logic unit in stages. That is, the bus interface logic unit may transfer one or more coherency granules of the data received from the master at a time once each snooping logic unit has provided indications that the one or more coherency granules may be transferred as described in greater detail below. It is noted that even though the following describes steps performed by a particular snooping logic unit that the description is applicable to each snooping logic unit of the multiprocessor system.

As stated above, a snooping logic unit may perform the snooping method on one or more of the coherency granules of the master request. The number of coherency granules that may be snooped at one time by a snooping logic unit may be dependent upon the particular snooping logic unit. Once the one or more coherency granules have been snooped, the bus interface logic unit may receive an acknowledgment from the snooping logic unit that the snooping logic unit performed the snooping on the one or more coherency granules via a multiple bit bus. Each bit in the bus may be associated with a particular coherency granule in the multi-coherency granule request. The bus interface logic unit may further receive an indication from the snooping logic unit as to whether the one or more coherency granules snooped were a hit in the cache associated with the snooping logic unit via a multiple bit bus. Each bit in the bus may be associated with a particular coherency granule in the multi-coherency granule request. The bus interface logic unit may further receive an indication from the snooping logic unit as to whether the data associated with the addresses of the one or more coherency granules that were a hit in the cache associated with the snooping logic unit have been updated via a multiple bit bus. Again, each bit in the bus may be associated with a particular coherency granule in the multi-coherency granule request. These indications may collectively be called a "collection of sets of indications" where each set of indications, i.e., each corresponding bit in each bus, is associated with a particular coherency granule in the multi-coherency granule request.

A determination may be made by the bus interface logic unit as to whether any of the data at the addresses of the coherency granules snooped had been updated in a cache in the system. If the data in a cache at the address of the coherency granules snooped had not been updated, then the bus interface unit may transfer to the slave the data associated with those coherency granules not updated as received from the master.

Alternatively, if the data in the cache at the address of the coherency granules snooped had been updated, then the bus interface unit may first allow the updated data to be copied from the associated cache and written to the slave. The bus interface unit may then transmit to the slave the data associated with those coherency granules that have been updated as received from the requesting master to overwrite the data copied from the associated cache thereby maintaining memory coherency.

A determination may then be made as to whether there are more coherency granules to snoop. If there are more coherency granules to snoop, then the snooping logic unit may snoop one or more coherency granules as described above. As stated above, each snooping logic unit may be configured to snoop at a different rate than the other snooping logic units thereby completing the snooping of all of the coherency granules of the request at a different time than the other snooping logic units. It is noted that the bus interface logic unit may be configured to only transfer the data received from the master to the slave associated with those coherency granules that have been snooped by each snooping logic unit in the multiprocessor system. Subsequently, the data requested to be written by the master may be written to the slave in a staggered manner.

If there are no more coherency granules to snoop, then the method is terminated.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
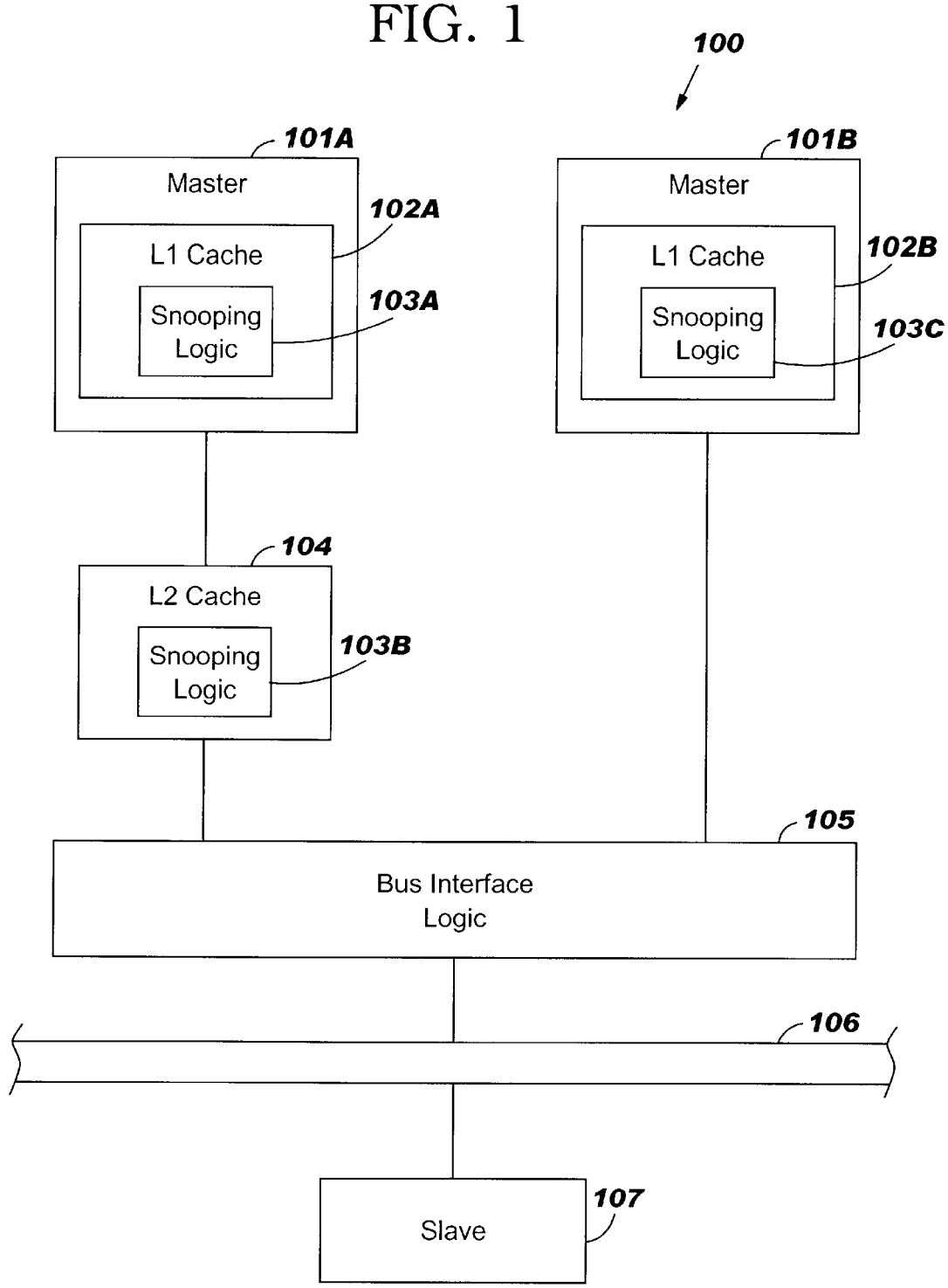
FIG. 1 illustrates a multiprocessor system configured in accordance with the present invention.

FIG. 1—Multiprocessor System

FIG. 1 illustrates an embodiment of a multiprocessor system 100 in accordance with the present invention. System 100 may comprise one or more masters 101A–B, e.g., processors. Master 101A may comprise a level one (L1) cache 102A, e.g., L1 instruction/data cache. L1 cache 102A may be configured to store instruction and data values that may be repeatedly accessed by master 102A. It is noted that those skilled in the art will recognize that multiple L1 caches, e.g., L1 instruction cache, L1 data cache, may be implemented instead of a unified L1 cache. L1 cache 102A may comprise a snooping logic unit 103A configured to monitor a bus, e.g., bus 106, for addresses requested by masters 101A–B as discussed in greater detail in conjunction with FIGS. 3 and 4. Similarly, master 101B may comprise a level one (L1) cache 102B, e.g., L1 instruction/data cache. L1 cache 102B may be configured to store instruction and data values that may be repeatedly accessed by master 102B. It is noted that those skilled in the art will recognize that multiple L1 caches, e.g., L1 instruction cache, L1 data cache, may be implemented instead of a unified L1 cache. L1 cache 102B may comprise a snooping logic unit 103C configured to monitor a bus, e.g., bus 106, for addresses requested by masters 101A–B as discussed in greater detail in conjunction with FIGS. 3 and 4. Masters 101A–B may collectively or individually be referred to as masters 101 or master 101, respectively.

In order to minimize data access latency, one or more additional levels of cache memory coupled to master 101, e.g., master 101A, may be implemented such as a level two (L2) cache 104 coupled to master 102A. The lower cache levels, e.g., L2 cache 104, may be employed to stage data to an L1 cache, e.g., L1 cache 102A, and typically have progressively larger storage capacities but longer access latencies. L2 cache 104 may comprise a snooping logic unit 103B configured to monitor a bus, e.g., bus 106, for addresses requested by masters 101A–B as discussed in greater detail in conjunction with FIGS. 3 and 4. Snooping logic units 103A–C may collectively or individually be referred to as snooping logic units 103 or snooping logic unit 103, respectively. It is noted that system 100 may comprise any number of masters 101 and that FIG. 1 is illustrative. It is further noted that each master 101 may be coupled to any number of additional levels of caches. It is further noted that each additional level of cache may comprise snooping logic unit 103 configured to monitor a bus, e.g., bus 106, for addresses requested by masters 101.

Referring to FIG. 1, each master 101 may be coupled to a bus interface logic unit 105 which may serve as an interface between bus 106 and masters 101. System 100 may further comprise a slave 107, e.g., system memory, coupled to bus 106. Bus 106 may subsequently permit the transfer of information, e.g., addresses, data, between masters 101 and slave 107.

Figure 3:
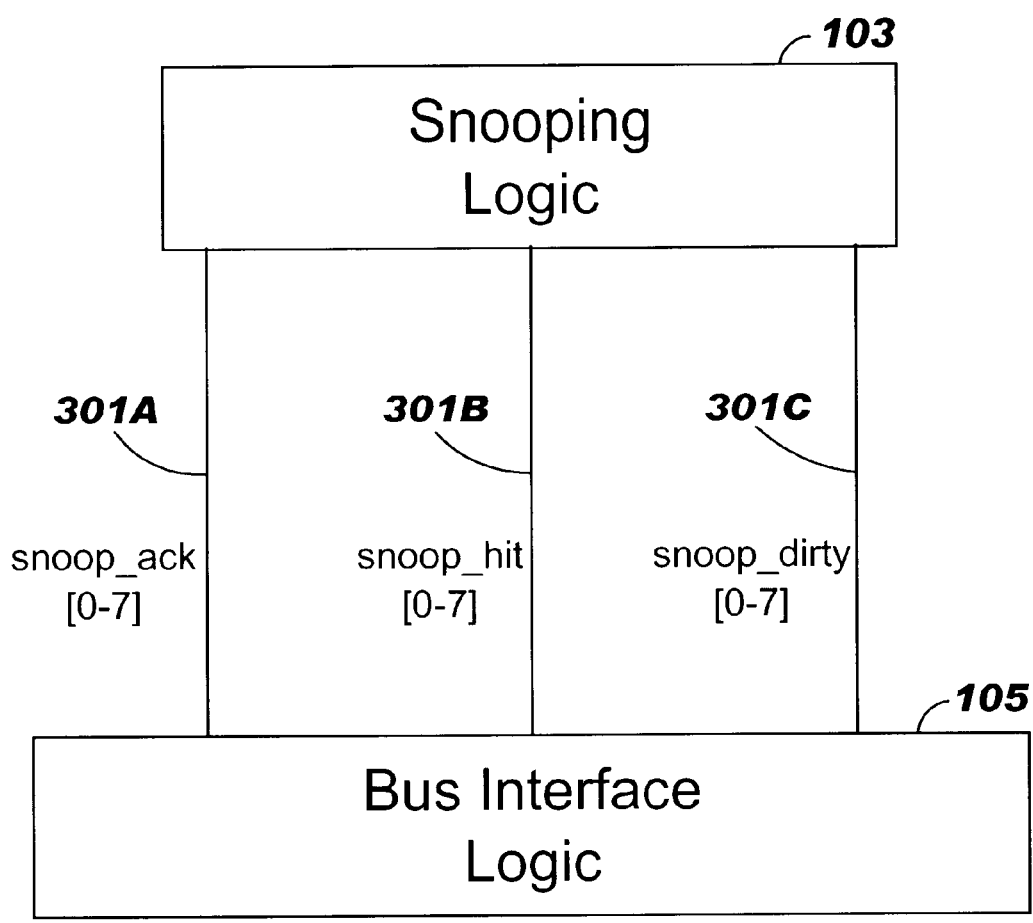
FIG. 3 illustrates an embodiment of the present invention of busses between a snooping logic unit and a bus interface logic unit.
Figure 4:
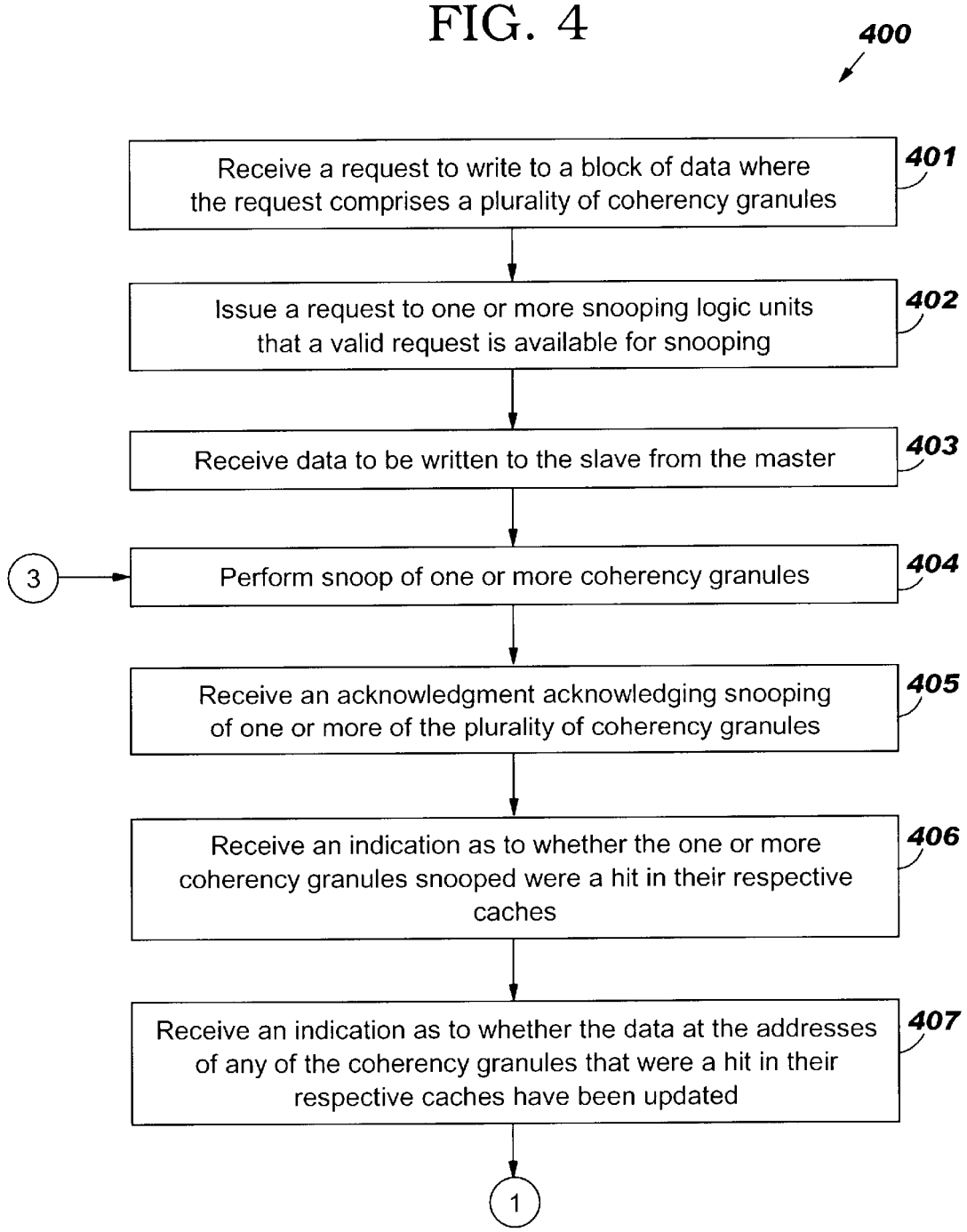
FIG. 4 is a flowchart of a method for performing a write request comprising a plurality of coherency granules in accordance with the present inventive principles.
Figure 4:
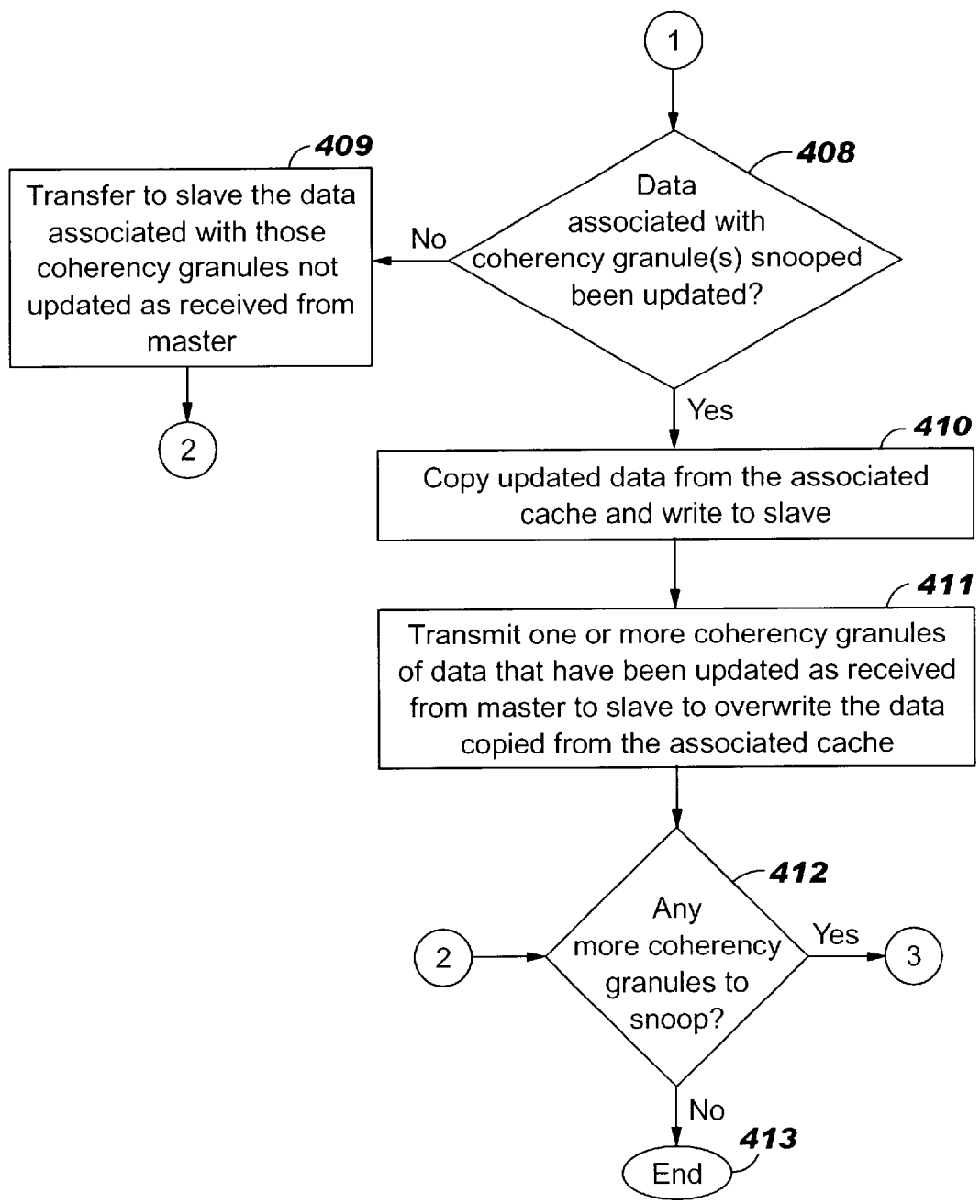

Referring to FIG. 1, bus interface logic unit 105 may be configured to permit master 101 to request to access a block of data from slave 107 comprising a plurality of coherency granules as explained in greater detail in conjunction with FIGS. 3–4. A coherency granule may be defined as the smallest cache line size of a cache in system 100. For example, if L1 caches 102A–B has a cache line size of 32 bytes and L2 cache 104 has a cache line size of 256 bytes, then the coherency granule of system 100 is 32 bytes.

Figure 2:
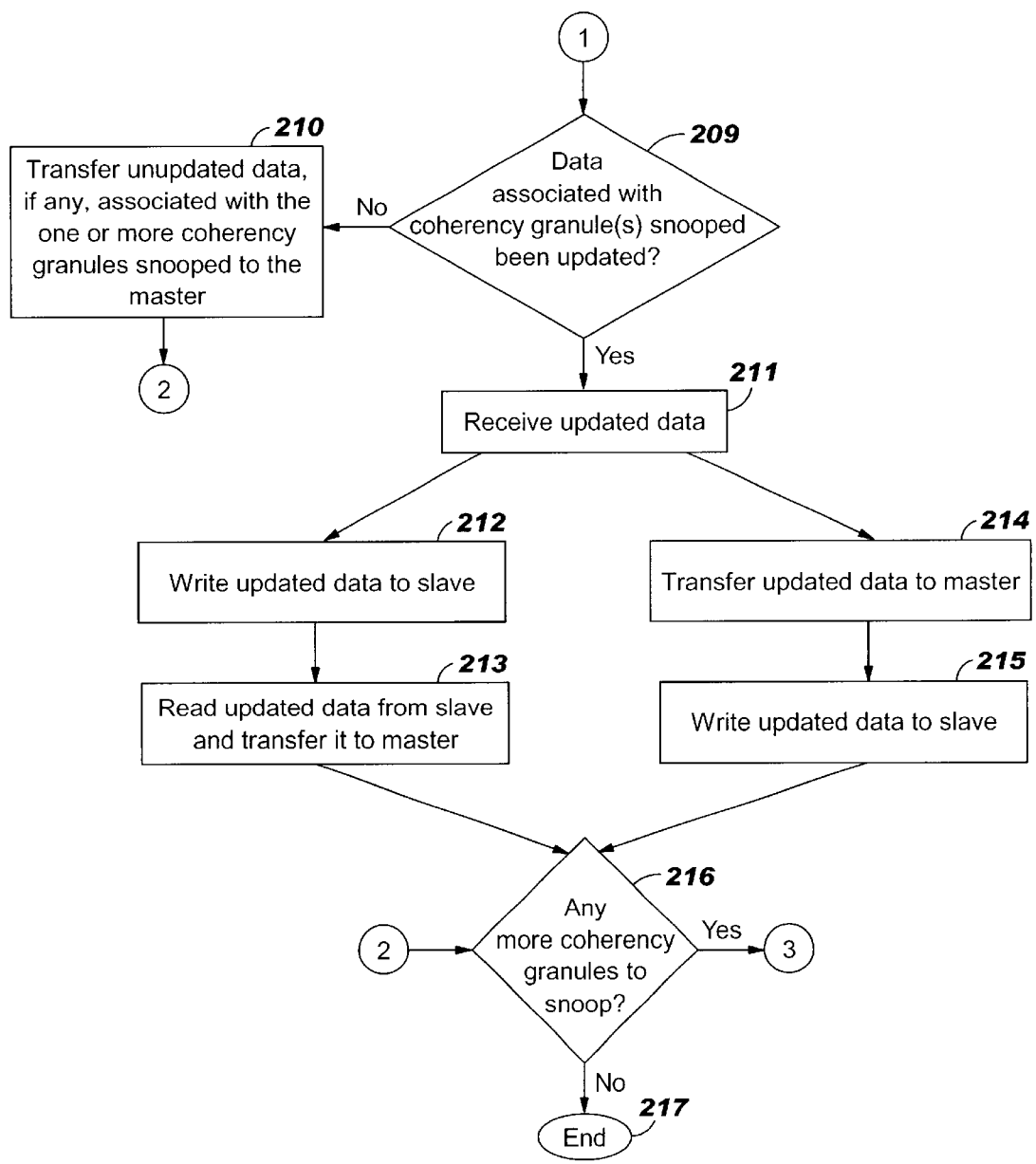
FIG. 2 is a flowchart of a method for performing a read request comprising a plurality of coherency granules in accordance with the present inventive principles.

FIG. 2—Method for Performing a Read Request Comprising a Plurality of Coherency Granules FIG. 2 is a flowchart of one embodiment of the present invention of a method 200 for performing a read request comprising a plurality of coherency granules. As stated in the Background Information section, when an operation is associated with a plurality of coherency granules, then as part of the operation the snooping logic associated with each processor may examine the coherency status of each of these coherency granules and respond accordingly. This may be accomplished by performing the operation as a series of independent requests where each request may consist of a single coherency granule. By issuing separate requests for each coherency granule involved in the operation, several additional bus cycles may be used and additional power may be consumed. These additional bus cycles and additional power may be associated with the independent requests themselves and the responses by the slaves to those independent requests. The additional bus cycles and additional power may also be associated with the independent snooping operations that may be performed by the snooping logic associated with each of the processors in the system. Alternatively, the system may perform the multi-coherency granule operation as a single request, but the snooping logic associated with each processor in the system may provide a single snoop response for the entire operation. The system in turn may have to wait for the snooping logic associated with each processor in the system to complete all of the snoop operations associated with the request before proceeding to initiate the transfer of data between the master entity making the request and the slave device for which the request is targeted. Again this procedure involves additional delay in performing the operation thereby inefficiently using the bandwidth available to the system. It would therefore be desirable to develop a heterogeneous multiprocessor environment that supports the issuing and receiving of a single request that references multiple coherency granules. It would further be desirable to develop a heterogeneous multiprocessor environment that allows the snooping logic associated with each processor in the system to provide the snoop response for only a portion of the requested coherency granules at a time such that the system makes forward progress on the operation with less delay thereby improving the bandwidth of the system and reducing overall power. Method 200 is such a method for performing a read request comprising a plurality of coherency granules.

In step 201, bus interface logic unit 105 (FIG. 1) may receive a request from master 101, e.g., master 101A (FIG. 1), (commonly referred to as a master request) to read a block of data comprising a plurality of coherency granules in slave 107 (FIG. 1). For example, bus interface logic unit 105 may receive a master request to read a block of 128 bytes of data in slave 107 from master 101. If the coherency granule of system 100 (FIG. 1) is 32 bytes, then the request to read a block of 128 bytes may be said to comprise four coherency granules, i.e., the request to read a block of 128 bytes may comprise four groupings of 32 bytes.

In step 202, bus interface logic unit 105 may issue a request to one or more snooping logic units 103 in each cache, e.g., L1 cache 102 (FIG. 1), L2 cache 104 (FIG. 1), in system 100 that a valid request is available for snooping. As stated in the Background Information section, snooping may refer to a method for snooping logic units 103 to monitor a bus, e.g., bus 106 (FIG. 1), for addresses requested by masters 101 and subsequently determine if a copy of the coherency granules associated with the requested addresses are within the cache associated with the snooping logic unit using a protocol commonly referred to as MESI.

In step 203, bus interface logic unit 105 may issue a request to slave 107 to retrieve the data requested by master 101. In step 204, bus interface logic unit 105 may receive the requested data from slave 107.

Recalling step 202, by a snooping logic unit 103 being informed that a valid request is available for snooping, snooping logic unit 103 may then perform the snooping method on one or more of the coherency granules of the master request in step 205. Each snooping logic unit 103 may be associated with a different sized cache line. For example, referring to FIG. 1, if master 101A issued a request to read a block of 128 bytes of data from slave 107, then bus interface logic unit 105 may issue a request to snooping logic units 103A–C that a valid request is available for snooping. If the cache line size of L1 caches 102A–B was 32 bytes and the cache line size of L2 cache 104 was 128 bytes, then the coherency granule of system 100 is 32 bytes. Each snooping logic unit 103 may be configured to snoop a particular number of coherency granules at a time. For example, snooping unit 103A associated with L1 cache 102A may be able to snoop 32 bytes at a time. That is, snooping unit 103A may be configured to determine if a copy of the address at each 32 byte grouping in the request is located in the cache, e.g., L1 cache 102A, associated with snooping unit 103A. Snooping unit 103C associated with L1 cache 102B may be able to snoop 64 bytes at a time. That is, snooping unit 103C may be configured to determine if a copy of the address at each 64 byte grouping in the request is located in the cache, e.g., L1 cache 102B, associated with snooping unit 103C. Snooping unit 103B associated with L2 cache 104 may be able to snoop 128 bytes at a time. That is, snooping unit 103B may be configured to determine if a copy of the address at each 128 byte grouping in the request is located in the cache, e.g., L2 cache 104, associated with snooping unit 103B. Since snooping units 103 may snoop a different number of coherency granules at a time, the data requested by master 101, e.g., master 101A, may be transferred to that master 101 by bus interface logic unit 105 in stages. That is, bus interface logic unit 105 may transfer one or more coherency granules of the data requested to master 101 at a time once each snooping logic unit 103 has provided an indication that the one or more coherency granules may be transferred as described in greater detail below. By bus interface logic unit 105 making a single snoop request to the snooping logic units 103 for the entire plurality of requested coherency granules, and by bus interface logic unit 105 transferring coherency granules of data to master 101 in stages, the bandwidth of system 100 may be more efficiently used while reducing the overall power. It is noted that steps 205–208 as described below may be performed by each snooping logic unit 103. It is further noted that even though the following describes steps 205–208 in conjunction with a particular snooping logic unit 103 that the description is applicable to each snooping logic unit 103 of system 100. It is further noted that steps 206–208 are described further below in conjunction with FIG. 3 which illustrates the multi-bit busses between a snooping logic unit 103 and bus interface logic unit 105. It is further noted that the indications received by bus interface logic unit 105 regarding one or more of the coherency granules in the multi-coherency granule request as described in steps 206–208 may collectively be referred to as a "collection of sets of indications." That is, the indications received by bus interface logic unit 105 as described in steps 206–208 regarding one or more of the coherency granules in the multi-coherency granule request snooped by snooping logic unit 103 in step 205 may collectively be referred to as a "collection of sets of indications." Each set of indications, e.g., acknowledgment bit, hit bit, dirty bit, is associated with a particular coherency granule in the multi-coherency granule request as explained further below.

As stated above, a snooping logic unit 103 may perform the snooping method on one or more of the coherency granules of the request in step 205. The number of coherency granules that may be snooped at one time by a snooping logic unit 103 may be dependent upon the particular snooping logic unit 103. For example, snooping logic unit 103A may be capable of snooping 32 bytes at one time; whereas, snooping logic unit 103C may be capable of snooping 128 bytes at one time. Once the one or more coherency granules have been snooped, bus interface logic unit 105 may receive an acknowledgment in step 206 from snooping logic unit 103 that snooping logic unit performed the snooping on the one or more coherency granules. Bus interface logic unit 105 may receive an acknowledgement from snooping logic unit 103 that particular coherency granules have been snooped via an acknowledgment bus as illustrated in FIG. 3.

FIG. 3 illustrates an embodiment of the present invention of busses between a snooping logic unit 103 and bus interface logic unit 105. Snooping logic unit 103 may communicate to bus interface logic unit 105 via an acknowledgment bus 301A, a hit bus 301B and a dirty bus 301C. Snooping logic unit 103 may indicate which coherency granules of the request were snooped via acknowledgement bus 301A. For example, referring to FIG. 3, acknowledgment bus 301A may be an 8-bit bus as indicated by snoop__ack[0–7]. Subsequently, acknowledgement bus snoop__ack [0–7] may represent up to eight coherency granules of the request. For example, if the coherency granule of system 100 is 32 bytes and the request issued by master 101 is a request to access a block of 128 bytes, then the request may comprise four groupings of 32 bytes. That is, the request may comprise four coherency granules. The first 32 bytes of the request may refer to the first coherency granule. The second 32 bytes of the request may refer to the second coherency granule and so forth. Subsequently, bits 0–3 of acknowledgment bus may indicate whether coherency granules 1–4 have been snooped, respectively, by snooping logic unit 103. If coherency granules 1 and 2 have been snooped, then snooping logic unit 103 may transmit bits 11000000 over acknowledgment bus 301A to bus interface logic unit 105 where a "1" may indicate that the coherency granule associated with that bit position has been snooped and a "0" may indicate that the coherency granule associated with that bit position has either not been snooped or is not contained within the requested plurality of coherency granules. It is noted that a "0" may instead be used to indicate that the coherency granule associated with that bit position has been snooped and a "1" may instead be used to indicated that the coherency granule associated with that bit position has either not been snooped or is not contained within the requested plurality of coherency granules. It is further noted that any bit position in acknowledgement bus snoop_ack[0–7] may be associated with any particular coherency granule. For example, bit positions 6 and 7 may be associated with coherency granules 2 and 1, respectively. Consequently, snooping logic unit 103 may transmit bits 00000011 over acknowledgment bus 301A to bus interface logic unit 105 where a "1" may indicate that the coherency granule associated with that bit position has been snooped.

Referring to FIGS. 2 and 3, bus interface logic unit 105 may receive an indication from snooping logic unit 103, e.g., snooping logic unit 103B, in step 207 as to whether the one or more coherency granules snooped were a hit in the cache, e.g., L2 cache 104, associated with snooping logic unit 103, e.g., snooping logic unit 103B. As stated above, snooping logic unit 103 may communicate to bus interface logic unit 105 via a hit bus 301B. Snooping logic unit 103 may indicate coherency granules snooped where a hit via hit bus 301B. For example, referring to FIG. 3, hit bus 301B may be an 8-bit bus as indicated by snoop_hit[0–7]. In such an embodiment, snoop_hit[0–7] may represent up to eight coherency granules of the request. Referring to the example provided above, if coherency granules 1 and 2 have been snooped, then snooping logic unit 103 may transmit bits 11000000 over acknowledgment bus 301A to bus interface logic unit 105 where a "1" may indicate that the coherency granule associated with that bit position has been snooped. If both coherency granules 1 and 2 were a hit in the cache, i.e., a copy of the addresses associated with coherency granules 1 and 2 were identified in the cache, associated with snooping logic unit 103, then snooping logic unit 103 may transmit bits 11000000 over hit bus 301B to bus interface logic unit 105 where a "1" may indicate that the coherency granule snooped has been a hit in the cache, e.g., L2 cache 104, associated with snooping logic unit 103, e.g., snooping logic 103B. A "0" may indicate that the coherency granule associated with that bit position that has been snooped was not a hit in the cache or is not contained within the requested plurality of coherency granules. It is noted that a "0" may be used to indicate that the coherency granule snooped had been in a hit in the cache, e.g., L2 cache 104, associated with snooping logic unit 103 and that a "1" may be used to indicate that the coherency granule associated with that bit position that has been snooped was not a hit in the cache or is not contained within the requested plurality of coherency granules. It is further noted that any bit position in hit bus snoop_hit[0–7] may be associated with any particular coherency granule. For example, bit positions 6 and 7 may be associated with coherency granules 2 and 1, respectively. Consequently, snooping logic unit 103 may transmit bits 00000011 over hit bus 301B to bus interface logic unit 105 where a "1" may indicate that the coherency granule snooped has been a hit in the cache associated with snooping logic unit 103.

Referring to FIGS. 2 and 3, bus interface logic unit 105 may receive an indication from snooping logic unit 103 in step 208 as to whether the data associated with the addresses of the one or more coherency granules that were a hit in the cache associated with snooping logic unit 103 have been updated in that cache. As stated above, snooping logic unit 103 may communicate to bus interface logic unit 105 via a dirty bus 301C. Snooping logic unit 103 may indicate that the data associated with the addresses of a coherency granule has been updated via dirty bus 301C. For example, referring to FIG. 3, dirty bus 301C may be an 8-bit bus as indicated by snoop_dirty[0–7]. In such an embodiment, dirty bus snoop_dirty[0–7] may represent up to eight coherency granules of the request. Referring to the example provided above, if the data at the addresses of coherency granules 1 and 2 were a hit in the cache, then the associated snooping logic unit 103 may transmit bits 11000000 over hit bus 301B to bus interface logic unit 105 where a "1" may indicate that the coherency granule associated with that bit position was a hit in the cache. If the data associated with the address of coherency granule 1 was updated but the data associated with the address of coherency granule 2 was not updated, then snooping logic unit 103 may transmit bits 10000000 over dirty bus 301C to bus interface logic unit 105 where a "1" may indicate that the data associated with the address of that coherency granule was updated. A "0" may indicate that the coherency granule associated with that bit position that has been a hit in the cache was not updated or is not contained within the requested plurality of coherency granules. It is noted that in an alternative embodiment, a "0" may be used to indicate that the data associated with the address of that coherency granule was updated and a "1" may indicate that data associated with the address of that coherency granule was not updated or is not contained within the requested plurality of coherency granules. It is further noted that the above is illustrative. It is further noted that any bit position in dirty bus snoop_dirty[0–7] may be associated with any particular coherency granule. For example, bit position 7 may be associated with coherency granule 1. Consequently, snooping logic unit 103 may transmit bits 00000001 over dirty bus 301C to bus interface logic unit 105 where a "1" may indicate that the data associated with the address of that coherency granule has been updated.

In step 209, once bus interface logic unit 105 has received a collection of sets of indications, a determination may be by bus interface logic unit 105 as to whether any of the data at the addresses of the coherency granules snooped had been updated. If the one or more coherency granules of the plurality of coherency granules of the request received in step 201 have been snooped by each snooping logic unit 103 and the data at the addresses of one or more of the one or more coherency granules snooped had not been updated, bus interface logic unit 105 may be configured to transmit to master 101 the data associated with the one or more of the one or more coherency granules snooped that were not updated in step 210. For example, if bus interface logic unit 105 received an indication from each snooping logic unit 103 that coherency granules 1 and 2 were snooped and that the data at the addresses of coherency granules 1 and 2 were not updated, then bus interface logic unit 105 may transmit the data at the addresses of coherency granules 1 and 2 to master 101.

If data at the address of a coherency granule snooped has been updated, then bus interface logic unit 105 may receive the updated data in step 211 from snooping logic unit 103 associated with the cache containing the updated data.

Upon receiving the updated data, bus interface logic unit 105 may write the received updated data to slave 107, e.g., system memory, in step 212 thereby updating slave 107 to maintain memory coherency within system 100. Bus interface logic unit 105 may then read the updated data from slave 107 and transfer the updated data to master 101 in step 213.

Upon receiving the updated data, bus interface logic unit 105 may instead directly transfer the received updated data to master 101 in step 214. Bus interface logic unit 105 may subsequently to or concurrently with step 214 write the updated data to slave 107 in step 215.

A determination may then be made in step 216 as to whether there are more coherency granules to snoop. If there are more coherency granules to snoop then snooping logic unit 103 may snoop one or more coherency granules of the request in step 205. As stated above, each snooping logic unit 103 may be configured to snoop at a different rate than other snooping logic units 103 thereby completing the snooping of all of the coherency granules of the request at a different time than other snooping logic units 103. It is noted that bus interface logic unit 105 may be configured to only transfer the non-updated or updated data associated with those coherency granules that have been snooped by each snooping logic unit 103 in system 100. Thus, the requested data may be transferred to master 101 in a staggered manner. By bus interface logic unit 105 transferring the requested data to master 101 in a staggered manner, the bandwidth of system 100 may be more efficiently used while reducing the overall power.

If there are no more coherency granules to snoop, then method 200 is terminated at step 217.

It is noted that method 200 may be executed in a different order presented and that the order presented in the discussion of FIG. 2 is illustrative. It is further noted that the steps in method 200, e.g., steps 204–208, steps 202–203, may be executed almost concurrently.

FIG. 4—Method for Performing a Write Request Comprising a Plurality of Coherency Granules FIG. 4 is a flowchart of one embodiment of the present invention of a method 400 for performing a write request comprising a plurality of coherency granules.

In step 401, bus interface logic unit 105 (FIG. 1) may receive a request (commonly referred to as a master request) to write a block of data, e.g., 128 bytes, to slave 107 (FIG. 1) where the block of data comprises a plurality of coherency granules, e.g., 32 bytes, from master 101, e.g., master 101A (FIG. 1). For example, bus interface logic unit 105 may receive a master request to write a block of 128 bytes of data to slave 107 from master 101. If the coherency granule of system 100 (FIG. 1) is 32 bytes, then the request to write a block of 128 bytes may be said to comprise four coherency granules, i.e., the request to write a block of 128 bytes may comprise four groupings of 32 bytes.

In step 402, bus interface logic unit 105 may issue a request to one or more snooping logic units 103 in each cache, e.g., L1 cache 102 (FIG. 1), L2 cache 104 (FIG. 1), in system 100 that a valid request is available for snooping. As stated in the Background Information section, snooping may refer to a method for snooping units 103 to monitor a bus, e.g., bus 106 (FIG. 1), for addresses requested by masters 101 and subsequently determine if a copy of the requested address is within the cache associated with the snooping unit using a protocol commonly referred to as MESI.

In step 403, bus interface logic unit 105 may receive data to be written to slave 107 from master 101.

Referring to step 402, by snooping logic unit 103 being informed that a valid request is available for snooping, snooping logic unit 103 may then perform the snooping method on one or more of the coherency granules of the master request in step 404. As stated above, each snooping logic unit 103 may be associated with a different sized cache line. For example, referring to FIG. 1, if master 101A issued a request to write a block of 128 bytes of data to slave 107, then bus interface logic unit 105 may issue a request to snooping logic units 103A–C that a valid request is available for snooping. If the cache line size of L1 caches 102A–B was 32 bytes and the cache line size of L2 cache 104 was 128 bytes, then the coherency granule of system 100 is 32 bytes. Each snooping logic unit 103 may be configured to snoop a particular number of coherency granules at a time. For example, snooping unit 103A associated with L1 cache 102A may be able to snoop 32 bytes at a time. That is, snooping unit 103A may be configured to determine if a copy of the address at each 32 byte grouping in the request is located in the cache, e.g., L1 cache 102A, associated with snooping unit 103A. Snooping unit 103C associated with L1 cache 102B may be able to snoop 64 bytes at a time. That is, snooping unit 103C may be configured to determine if a copy of the address at each 64 byte grouping in the request is located in the cache, e.g., L1 cache 102B, associated with snooping unit 103C. Snooping unit 103B associated with L2 cache 104 may be able to snoop 128 bytes at a time. That is, snooping unit 103B may be configured to determine if a copy of the address at each 128 byte grouping in the request is located in the cache, e.g., L2 cache 104, associated with snooping unit 103B. Since snooping units 103 may snoop a different number of coherency granules at a time, the data received from master 101, e.g., master 101A, may be transferred to slave 107 in stages. That is, bus interface logic unit 105 may transfer one or more coherency granules of the data received from master 101 at a time once each snooping logic unit 103 has provided an indication that the one or more coherency granules may be transferred as described in greater detail below. By bus interface logic unit 105 transmitting coherency granules of data received from master 101 to slave 107 in stages, the bandwidth of system 100 may be more efficiently used while reducing the overall power. It is noted that steps 404–407 as described below may be performed by each snooping logic unit 103. It is further noted that even though the following describes steps 404–407 in conjunction with a particular snooping logic unit 103 that the description is applicable to each snooping logic unit 103 of system 100. It is further noted that steps 405–407 are described further below in conjunction with FIG. 3 which illustrates the multi-bit busses between a snooping logic unit 103 and bus interface logic unit 105. It is further noted that the indications received by bus interface logic unit 105 regarding one or more of the coherency granules in the multi-coherency granule request as described in steps 405–407 may collectively be referred to as a "collection of sets of indications." That is, the indications received by bus interface logic unit 105 as described in steps 405–407 regarding one or more of the coherency granules in the multi-coherency granule request snooped by snooping logic unit 103 in step 404 may collectively be referred to as a "collection of sets of indications." Each set of indications, e.g., acknowledgment bit, hit bit, dirty bit, is associated with a particular coherency granule in the multi-coherency granule request as explained further below.

As stated above, a snooping logic unit 103 may perform the snooping method on one or more of the coherency granules of the request in step 404. The number of coherency granules that may be snooped at one time by a snooping logic unit 103 may be dependent upon the particular snooping logic unit 103. For example, snooping logic unit 103A may be capable of snooping 32 bytes at one time; whereas, snooping logic unit 103C may be capable of snooping 128 bytes at one time. Once the one or more coherency granules have been snooped, bus interface logic unit 105 may receive an acknowledgment in step 405 from snooping logic unit 103 that snooping logic unit performed the snooping on the one or more coherency granules. Bus interface logic unit 105 may receive an acknowledgment from snooping logic unit 103 that particular coherency granules have been snooped via acknowledgment bus 301A as illustrated in FIG. 3 as discussed above.

Referring to FIGS. 3 and 4, bus interface logic unit 105 may receive an indication from snooping logic unit 103, e.g., snooping logic unit 103B, in step 406 as to whether the one or more coherency granules snooped were a hit in the cache, e.g., L2 cache 104, associated with snooping logic unit 103, e.g., snooping logic unit 103B. Bus interface logic unit 105 may receive an indication from snooping logic unit 103 as to whether the one or more coherency granules snooped were a hit in the cache via hit bus 301B as discussed above.

Referring to FIGS. 3 and 4, bus interface logic unit 105 may receive an indication from snooping logic unit 103 in step 407 as to whether the data associated with the addresses of the one or more coherency granules that were a hit in the cache associated with snooping logic unit 103 have been updated. Bus interface logic unit 105 may receive an indication from snooping logic unit 103 as to whether the data associated with the addresses of the one or more coherency granules that were a hit in the cache have been updated via dirty bus 301C as discussed above.

In step 408, a determination may be made by bus interface logic unit 105 as to whether any of the data at the addresses of the coherency granules snooped had been updated in a cache in the system. If the data in a cache at the address of the coherency granules snooped had not been updated, then bus interface unit 105 may transfer to slave 107 the data associated with those coherency granules not updated as received from master 101 in step 409. For example, if bus interface logic unit 105 received an indication from each snooping logic unit 103 that coherency granules 1 and 2 were snooped and that the data at the addresses of coherency granules 1 and 2 were not updated, then bus interface logic unit 105 may transmit the data at the addresses of coherency granules 1 and 2 to slave 107.

Alternatively, if the data in the cache at the address of the coherency granules snooped had been updated, then bus interface unit 105 may allow the updated data to be copied from the associated cache and written to slave 107 in step 410. Bus interface unit 105 may then transmit to slave 107 the data associated with those coherency granules that have been updated as received from master 101 to overwrite the data copied from the associated cache thereby maintaining memory coherency in step 411.

A determination may then be made in step 412 as to whether there are more coherency granules to snoop. If there are more coherency granules to snoop, then snooping logic unit 103 may snoop one or more coherency granules of the request in step 404. As stated above, each snooping logic unit 103 may be configured to snoop at a different rate than other snooping logic units 103 thereby completing the snooping of all of the coherency granules of the request at a different time than other snooping logic units 103. It is noted that bus interface logic unit 105 may be configured to only transfer the data received from master 101 to slave 107 associated with those coherency granules that have been snooped by each snooping logic unit 103 in system 100. Thus, the data requested to be written by master may be written to slave 107 in a staggered manner. By bus interface logic unit 105 transferring the data received from master 101 to slave 107 in a staggered manner, the bandwidth of system 100 may be more efficiently used while reducing the overall power.

If there are no more coherency granules to snoop, then method 400 is terminated at step 413.

It is noted that method 400 may be executed in a different order presented and that the order presented in the discussion of FIG. 4 is illustrative. It is further noted that the steps in method 400, e.g., steps 403–407, may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for performing variable-sized memory coherency transactions comprising the steps of:

receiving a request to access a block of data from a master, wherein said block comprises a plurality of coherency granules, wherein a coherency granule comprises a smallest cache line size of any cache in a system;

issuing a request to a snooping logic unit in a cache in said system to indicate that said request to access said block of data comprising said plurality of coherency granules is available for snooping, wherein said snooping logic unit is configured to monitor a bus for addresses requested by said master, wherein said snooping logic unit performs a snoop of addresses of said plurality of coherency granules; and receiving a plurality of sets of indications from said snooping logic unit regarding said plurality of coherency granules, wherein each set of indications is associated with a particular coherency granule within said plurality of coherency granules.

2. The method as recited in claim 1, wherein each set of indications includes a member which indicates an acknowledgment of snooping of an address of a particular coherency granule within said plurality of coherency granules.

3. The method as recited in claim 2, wherein each set of indications includes a member which indicates whether a particular coherency granule within said plurality of coherency granules of said request snooped has been a hit in said cache.

4. The method as recited in claim 3, wherein each set of indications includes a member which indicates whether any data at an address of a particular coherency granule within said plurality of coherency granules snooped that is a hit in said cache has been updated.

5. The method as recited in claim 1, wherein said plurality of sets of indications is received in a substantially concurrent manner.

6. The method as recited in claim 1, wherein said plurality of sets of indications is received in a staggered manner.

7. The method as recited in claim 6 further comprising the step of:

receiving a first collection of one or more sets of indications regarding one or more coherency granules contained within said request prior to receiving a second collection of one or more sets of indications regarding one or more coherency granules contained within said request.

8. The method as recited in claim 7 further comprising the step of:
   transferring data at addresses of said one or more coherency granules associated with said first collection of one or more sets of indications prior to transferring data at addresses of said one or more coherency granules associated with said second collection of one or more sets of indications.

9. A system, comprising:
   a master configured to issue a request to access a block of data, wherein said block comprises a plurality of coherency granules, wherein a coherency granule is a smallest cache line size of any cache in said system;
   a bus interface logic unit coupled to said master configured to receive said request issued from said master; and
   a snooping logic unit coupled to said bus interface logic unit, wherein said snooping logic unit is configured to monitor a bus for addresses requested by said master, wherein said snooping logic unit performs a snoop of addresses of said plurality of coherency granules;
   wherein said bus interface logic unit comprises:
      circuitry operable for receiving a request to access a block of data from said master;
      circuitry operable for issuing a request to said snooping logic unit in a cache in said system to indicate that said request to access said block of data comprising said plurality of coherency granules is available for snooping; and
      circuitry operable for receiving a plurality of sets of indications from said snooping logic unit regarding said plurality of coherency granules, wherein each set of indications is associated with a particular coherency granule within said plurality of coherency granules.

10. The system as recited in claim 9, wherein each set of indications includes a member which indicates an acknowledgment of snooping of an address of a particular coherency granule within said plurality of coherency granules.

11. The system as recited in claim 10, wherein each set of indications includes a member which indicates whether a particular coherency granule within said plurality of coherency granules of said request snooped has been a hit in said cache.

12. The system as recited in claim 11, wherein each set of indications includes a member which indicates whether any data at an address of a particular coherency granule within said plurality of coherency granules snooped that is a hit in said cache has been updated.

13. The system as recited in claim 9, wherein said plurality of sets of indications is received in a substantially concurrent manner.

14. The system as recited in claim 9, wherein said plurality of sets of indications is received in a staggered manner.

15. The system as recited in claim 14, wherein said bus interface unit logic unit further comprises:
   circuitry operable for receiving a first collection of one or more sets of indications regarding one or more coherency granules contained within said request prior to receiving a second collection of one or more sets of indications regarding one or more coherency granules contained within said request.

16. The system as recited in claim 15, wherein said bus interface unit logic unit further comprises:
   circuitry operable for transferring data at addresses of said one or more coherency granules associated with said first collection of one or more sets of indications prior to transferring data at addresses of said one or more coherency granules associated with said second collection of one or more sets of indications.

17. A system, comprising:
   means for receiving a request to access a block of data from a master, wherein said block comprises a plurality of coherency granules, wherein a coherency granule comprises a smallest cache line size of any cache in a system;
   means for issuing a request to a snooping logic unit in a cache in said system to indicate that said request to access said block of data comprising said plurality of coherency granules is available for snooping, wherein said snooping logic unit is configured to monitor a bus for addresses requested by said master, wherein said snooping logic unit performs a snoop of addresses of said plurality of coherency granules; and
   means for receiving a plurality of sets of indications from said snooping logic unit regarding said plurality of coherency granules, wherein each set of indications is associated with a particular coherency granule within said plurality of coherency granules.

18. The system as recited in claim 17, wherein each set of indications includes a member which indicates an acknowledgment of snooping of an address of a particular coherency granule within said plurality of coherency granules.

19. The system as recited in claim 18, wherein each set of indications includes a member which indicates whether a particular coherency granule within said plurality of coherency granules of said request snooped has been a hit in said cache.

20. The system as recited in claim 19, wherein each set of indications includes a member which indicates whether any data at an address of a particular coherency granule within said plurality of coherency granules snooped that is a hit in said cache has been updated.

21. The system as recited in claim 17, wherein said plurality of sets of indications is received in a substantially concurrent manner.

22. The system as recited in claim 17, wherein said plurality of sets of indications is received in a staggered manner.

23. The system as recited in claim 22 further comprises:
   means for receiving a first collection of one or more sets of indications regarding one or more coherency granules contained within said request prior to receiving a second collection of one or more sets of indications regarding one or more coherency granules contained within said request.

24. The system as recited in claim 23 further comprises:
   means for transferring data at addresses of said one or more coherency granules associated with said first collection of one or more sets of indications prior to transferring data at addresses of said one or more coherency granules associated with said second collection of one or more sets of indications.

* * * * *